US011690386B2

(12) United States Patent
Albrecht

(10) Patent No.: US 11,690,386 B2
(45) Date of Patent: Jul. 4, 2023

(54) ICE CREAM MAKING METHODS AND SYSTEMS

(71) Applicant: WELLS ENTERPRISES, ICN., Le Mars, IA (US)

(72) Inventor: David D. Albrecht, Le Mars, IA (US)

(73) Assignee: Wells Enterprises, Inc., Le Mars, IA (US)

(*) Notice: Subject to any disclaimer, the term of this patent is extended or adjusted under 35 U.S.C. 154(b) by 624 days.

(21) Appl. No.: 16/630,651

(22) PCT Filed: Jul. 12, 2018

(86) PCT No.: PCT/US2018/041769
§ 371 (c)(1),
(2) Date: Jan. 13, 2020

(87) PCT Pub. No.: WO2019/014421
PCT Pub. Date: Jan. 17, 2019

(65) Prior Publication Data
US 2021/0145020 A1    May 20, 2021

Related U.S. Application Data

(60) Provisional application No. 62/532,689, filed on Jul. 14, 2017.

(51) Int. Cl.
*A23G 9/06* (2006.01)
*A23G 9/22* (2006.01)
*A23G 9/28* (2006.01)

(52) U.S. Cl.
CPC .............. *A23G 9/06* (2013.01); *A23G 9/224* (2013.01); *A23G 9/28* (2013.01)

(58) Field of Classification Search
CPC . A23G 9/06; A23G 9/08; A23G 9/224; A23G 9/28
See application file for complete search history.

(56) References Cited

U.S. PATENT DOCUMENTS

| | | | |
|---|---|---|---|
| 4,702,611 A * | 10/1987 | Crossley ............... | A47J 43/044 366/601 |
| 4,993,238 A | 2/1991 | Inagaki | |
| 5,345,781 A * | 9/1994 | Fels ........................ | A23G 9/285 366/85 |
| 5,823,675 A * | 10/1998 | Myerly ................... | A23G 9/227 366/310 |
| 7,455,868 B2 | 11/2008 | Kennedy et al. | |
| 8,628,811 B2 * | 1/2014 | Panyam ................... | A23G 9/46 426/305 |

(Continued)

FOREIGN PATENT DOCUMENTS

| | | | | |
|---|---|---|---|---|
| EP | 1331854 B1 | 12/2006 | | |
| ES | 2386698 T3 * | 8/2012 | ............. | A23G 9/045 |
| GB | 2287306 A * | 9/1995 | ............... | A23G 9/04 |

OTHER PUBLICATIONS

PCT International Search Report and Written Opinion completed by the ISA/KR dated May 7, 2019 and issued in connection with PCT/US2018/041769.

*Primary Examiner* — Miguel A Diaz
(74) *Attorney, Agent, or Firm* — Barnes & Thornburg LLP

(57) ABSTRACT

A predetermined volume of ice-cream mix is provided to an ice cream making system or method. The ice-cream mix is cooled and whipped to form ice cream.

14 Claims, 3 Drawing Sheets

(56) References Cited

U.S. PATENT DOCUMENTS

| | | | |
|---|---|---|---|
| 9,433,230 B1* | 9/2016 | Fisher | A23G 9/20 |
| 2006/0110515 A1* | 5/2006 | Waletzko | A23G 9/08 |
| | | | 426/565 |
| 2008/0011009 A1 | 1/2008 | Timmons | |

* cited by examiner

ICE CREAM MAKING METHODS AND SYSTEMS

CROSS REFERENCE TO RELATED APPLICATIONS

This application is a U.S. national counterpart application of international application serial No. PCT/US2018/041769, filed Jul. 12, 2018 which claims priority to U.S. Provisional Patent Application No. 62/532,689 filed Jul. 14, 2017, the disclosures of both of which are referenced in their entireties.

FIELD OF THE DISCLOSURE

The present disclosure relates generally to methods and systems for making ice cream, and more specifically to methods and systems of solidifying ice-cream mix to make ice cream.

BACKGROUND

Traditionally, ice cream is made by placing ice-cream mix into a container surrounded by ice. The container is turned periodically to cool the ice-cream mix until the ice-cream mix solidifies to form ice cream. The ice-cream mix may contain, for example, cream, sugar, and milk among other ingredients.

Some commercial ice-cream manufacturing processes include a scraped surface heat exchanger to cool the ice-cream mix. Scraped surface heat exchangers include a cylinder that defines an internal storage region and a rotating shaft assembly located in the internal storage region of the cylinder. Ice-cream mix is placed into the internal storage region and the cylinder is chilled. The ice-cream mix touching the chilled cylinder wall cools and solidifies to form ice cream. The rotating shaft assembly includes a plurality of blades that scrape the solidified ice cream from the chilled cylinder wall to allow more liquid ice-cream mix to move toward the chilled cylinder wall to be solidified. The cylinder is cooled and the ice-cream mix is scraped until all of the ice-cream mix has been solidified into ice cream.

SUMMARY

An ice cream making system according to the present disclosure includes a freezer and a dispenser. The freezer is configured to solidify liquid ice-cream mix to form ice cream. The dispenser is configured to discharge the ice cream from the ice cream making system.

In illustrative embodiments, the freezer included in the disclosed system provides means for adding compressed nitrogen to liquid ice-cream mix and for whipping the nitrogen into the liquid ice-cream mix to cool/solidify the ice-cream mix and to bulk the resulting solid ice cream. In other words, the compressed nitrogen freezes the liquid ice-cream mix and is mixed into the ice cream as it freezes to add volume to the solidified ice cream.

In illustrative embodiments, the amount of compressed nitrogen is controlled based on the temperature/pressure of the nitrogen and the amount of liquid ice cream mix being converted to solid ice cream. By controlling the nitrogen added to the liquid ice cream mix, the temperature of the resulting solid ice cream and the amount of nitrogen absorbed in the ice cream can be predetermined. As a result, the volume of ice cream made from a given volume of ice-cream mix (sometimes called overrun) is controlled.

In illustrative embodiments, the freezer is a nitrogen freezer that includes a nitrogen source and a volumetric controller. The volumetric controller is configured to meter the compressed nitrogen added to the liquid ice-cream mix to obtain ice cream with a desired temperature and overrun. In illustrative embodiments, the compressed nitrogen freezes the liquid ice-cream mix such that the weight, cost, and complexity of a typical freezer such as, for example, a scraped surface heat exchanger can be omitted from the ice cream making system. This may allow for smaller ice cream making systems that can be located in a restaurant to serve fresh premium ice cream with consistent overrun, on demand.

In illustrative embodiments, the nitrogen freezer further includes a mixer configured to whip the compressed nitrogen into the liquid ice-cream mix so that the ice cream has an overall volume greater than the volume of liquid ice-cream mix. The volume of the compressed nitrogen and the liquid ice-cream mix is metered so that the predetermined amount of nitrogen is whipped into the mix to form ice cream with a desired overrun with relatively small crystals to provide the ice cream with a premium taste and feel.

These and other features of the present disclosure will become more apparent from the following description of the illustrative embodiments.

DETAILED DESCRIPTION OF THE DRAWINGS

Figure 1:
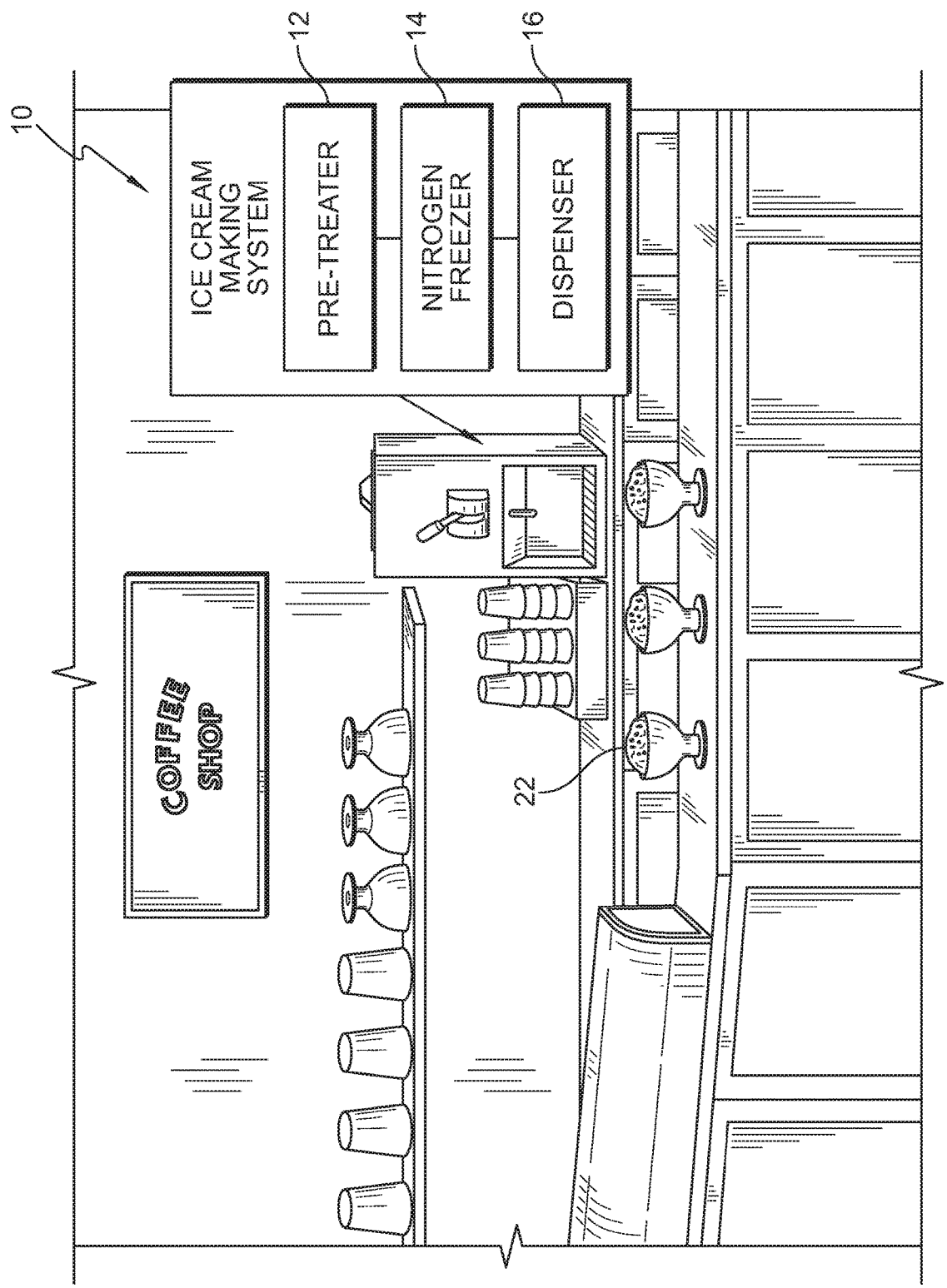
FIG. 1 is a perspective and diagrammatic view of an ice cream making system in accordance with the present disclosure showing that the ice cream making system is located in a restaurant and configured to produce fresh ice cream on location, and diagrammatically showing that the ice cream making system includes a pre-treater, a nitrogen freezer, and a dispenser.

For the purposes of promoting an understanding of the principles of the disclosure, reference will now be made to a number of illustrative embodiments illustrated in the drawings and specific language will be used to describe the same.

Figure 2:
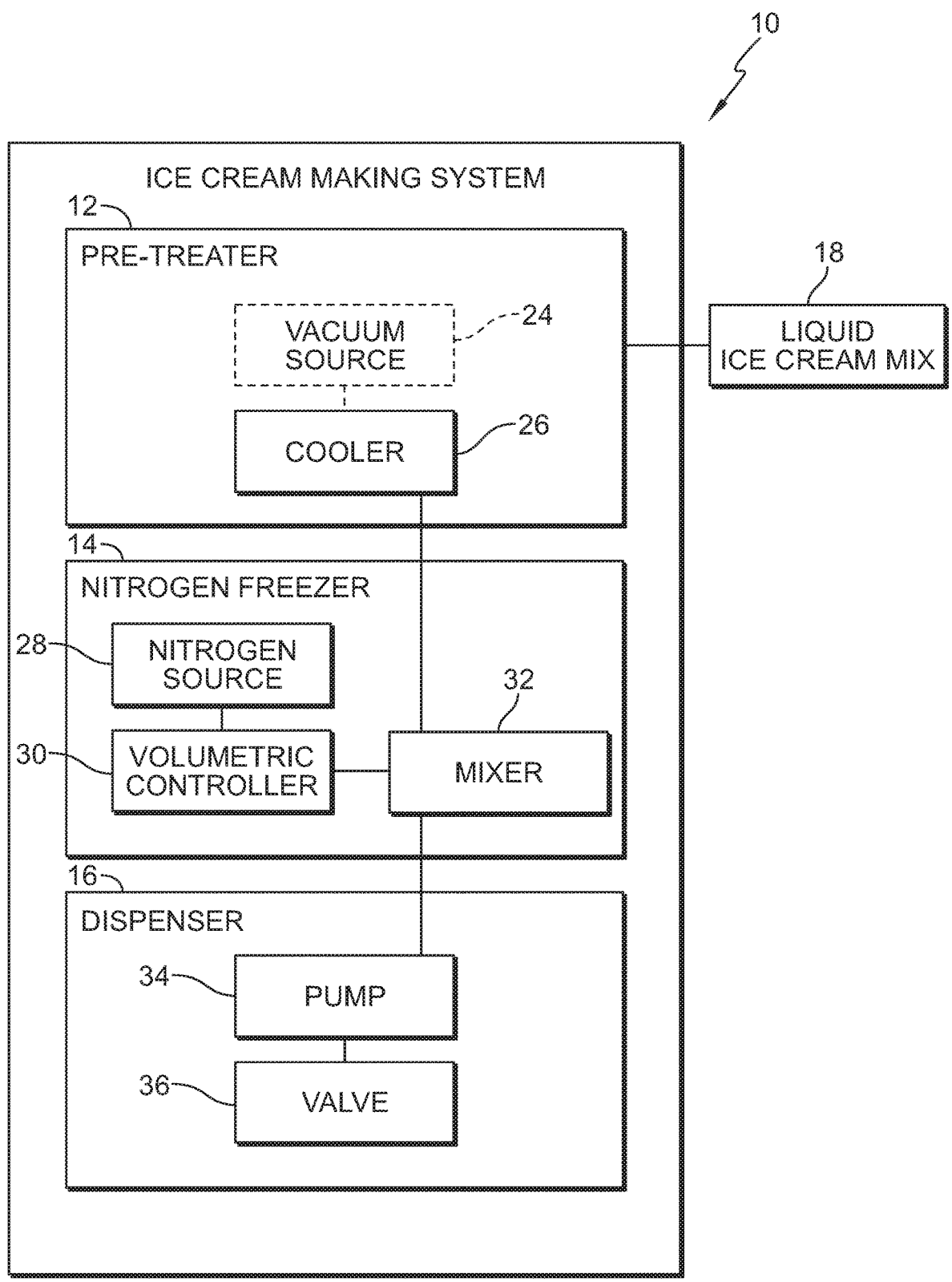
FIG. 2 is a diagrammatic view of the ice cream making system of FIG. 1 showing that the pre-treater includes a vacuum source configured to apply a vacuum to a predetermined volume of liquid ice-cream mix and a cooler configured to cool the ice-cream mix; showing that the nitrogen freezer includes a nitrogen source, a volumetric controller configured to add a predetermined volume of nitrogen to the ice-cream mix, and a mixer configured to whip the nitrogen into the ice-cream mix and solidify the ice-cream mix to form ice cream with a desired overrun; and showing that the dispenser includes a pump and a valve configured to discharge the ice cream.
Figure 3:
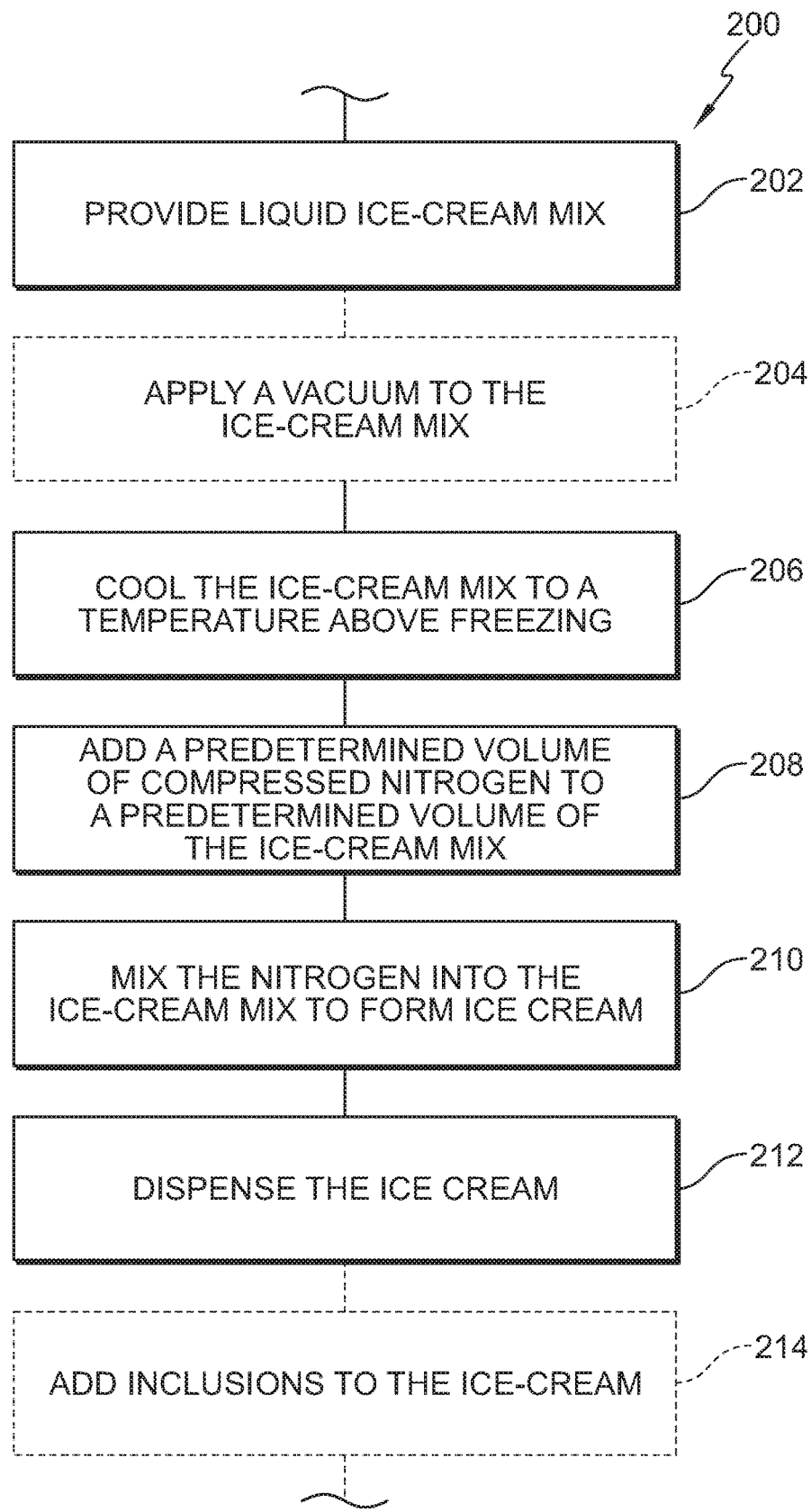
FIG. 3 is a diagrammatic view of a method of making ice cream in accordance with the present disclosure, the method including providing a predetermined volume of ice-cream mix, optionally applying a vacuum to the ice-cream mix, cooling the ice-cream mix, adding a predetermined volume of compressed nitrogen to the ice-cream mix, mixing the nitrogen into the ice-cream mix, dispensing the ice cream, and optionally adding inclusions such as, for example, chocolate chunks to the ice cream.

An ice cream making system 10 in accordance with the present disclosure is shown in FIGS. 1 and 2. The ice cream making system 10 is configured to add compressed nitrogen 28 to a liquid ice-cream mix 18 to form solidified ice cream 22 with a fresh and premium taste and feel. In some embodiments, the ice cream making system 10 includes means for adding a predetermined volume of compressed nitrogen to a predetermined volume of the liquid ice-cream mix 18 and whipping the predetermined volume of compressed nitrogen into the predetermined volume of ice-cream mix 18 to solidify the ice-cream mix 18 and form the solid ice cream 22. A method 200 of making ice cream in accordance with the present disclosure is shown in FIG. 3. The ice cream making system 10 and method 200 may be used in a factory setting to mass produce ice cream 22 or in a restaurant such as, for example, a coffee shop to provide freshly made ice cream 22 on demand as suggested in FIG. 1.

The compressed nitrogen 28 is added to the ice-cream mix 18, both in a predetermined amount, to freeze the ice-cream mix 18 without the use of traditionally freezers such as, for example, scraped surface heat exchangers. As a result, the size, weight, complexity, and cost of a traditionally freezer may be removed from the ice cream making system 10. Additionally, the ice cream 22 formed using the compressed nitrogen 28 may have relatively smaller ice crystals which may give the ice cream a better quality as compared to ice cream formed using traditionally freezers. For example, the ice cream 22 may have a better taste and feel.

The compressed nitrogen 28 further acts as an overrun agent to increase the volume of the ice-cream mix. As a result, the compressed nitrogen may replace a portion or all of the air traditionally used to increase the volume of the ice-cream mix. Overrun is the percent increase of volume of ice cream produced from a given volume of ice-cream mix. As an example, 2-gallons of ice cream produced from 1-gallon of ice-cream mix has an overrun of 100 percent.

The ice cream making system 10 includes a pre-treater 12, a nitrogen freezer 14, and a dispenser 16 as shown in FIGS. 1 and 2. The pre-treater 12 receives and cools the liquid ice-cream mix 18. The nitrogen freezer 14 adds the compressed nitrogen to the cooled ice-cream mix 18 and mixes the nitrogen into the ice-cream mix 18 to form ice cream 22. The dispenser 16 is configured to discharge the ice cream 22 from the ice cream making system 10 into a container. In some embodiments, the ice-cream mix 18 is first provided as a dry mix and a liquid such as, for example, water or milk is added to the dry mix to provide the liquid ice-cream mix 18.

In the illustrative embodiment, the pre-treater 12 includes a vacuum source 24 and a cooler 26 as shown in FIG. 2. The ice-cream mix 18 is received in the pre-treater and the vacuum source 24 applies a vacuum to the ice-cream mix 18 to cause the ice-cream mix 18 to more readily mix with the compressed nitrogen 28. The cooler 26 is configured to cool the ice-cream mix 18 to a temperature above a freezing temperature of the ice-cream mix. In some embodiments, the cooler 26 cools the ice cream to between about 27 degrees and about 34 degrees Fahrenheit. In the illustrative embodiment, the cooler 26 cools the ice-cream mix 18 to between about 30 to about 32 degrees Fahrenheit. The vacuum source 24 is optional such that, in some embodiments, the vacuum source 24 is omitted.

The nitrogen freezer 14 includes a nitrogen source 28, a volumetric controller 30, and a mixer 32 as shown in FIG. 2. After the liquid ice-cream mix 18 is cooled, the volumetric controller 30 adds a predetermined volume of compressed nitrogen from the nitrogen source 28 to a predetermined volume of the liquid ice-cream mix 18 as shown in FIG. 2. The mixer 32 whips the nitrogen into the ice-cream mix 18.

The nitrogen cools the ice-cream mix 18 and solidifies the ice-cream mix 18 to form ice cream 22. In some embodiments, the ice cream 22 is formed and dispensed at about 26 degrees Fahrenheit. The ice cream 22 has relatively small ice crystals as compared to ice cream formed by traditionally freezers. The ice cream 22 has an overrun based at least in part on the predetermined volumes of compressed nitrogen and ice-cream mix 18.

Traditionally, air is whipped into ice-cream mix. In the illustrative embodiment, the nitrogen whipped into the ice-cream mix 18 replaces a portion or all of the air traditionally whipped into the ice-cream mix 18. In some embodiments, the vacuum is applied to the nitrogen freezer 14. As a result, little to no air is available to whip into the ice-cream mix 18 and the nitrogen is substantially the only gas whipped into the ice-cream mix 18.

In some embodiments, the mixer 32 includes an aerator. In some embodiments, air and nitrogen are whipped into the ice-cream mix 18 by the aerator. In some embodiments, the aerator whips only the nitrogen into the ice-cream mix 18. In some embodiments, the mixer 32 includes a Mondomix brand aerator.

In some embodiments, the overrun is between about 20 percent and about 130 percent. In some embodiments, the overrun is between about 20 percent and about 100 percent. In some embodiments, the overrun is between about 20 percent and about 80 percent. In some embodiments, the overrun is between about 20 percent and about 50 percent. In some embodiments, the overrun is between about 50 percent and about 100 percent. In some embodiments, the overrun is between about 50 percent and about 80 percent.

In some embodiments, the compressed nitrogen expands to approximately 150 times the initial predetermined volume. As an example, 1 ounce of compressed nitrogen may expand to 150 ounces of nitrogen in the ice-cream mix 18. In one embodiment, about 0.853 ounces of compressed nitrogen is whipped into 1 gallon of ice-cream mix 18 to form 2 gallons of ice cream with an overrun of 100 percent.

In some embodiments, the compressed nitrogen includes liquid nitrogen. In some embodiments, the compressed nitrogen includes gaseous nitrogen. In some embodiments, the compressed nitrogen has a temperature of between about −365 degrees Fahrenheit to about −300 degrees Fahrenheit.

The dispenser 16 includes a pump 34 and a valve 36 as shown in FIG. 2. The pump 34 urges the ice cream 22 from the nitrogen freezer toward the valve 36 in response to a user input. The valve 36 ejects the ice cream 22 out of the ice cream making system 10 into a container for storage or consumption. Additional inclusions such as, for example, chocolate chunks, may be added to the ice cream 22. In some embodiments, the pump 34 includes a piston vacuum pump 34. In some embodiments, the pump 34 includes a Marlen International Brand Pump. In some embodiments, the pump 34 includes a vane style pump 34. In some embodiments, the pump 34 includes an auger style pump 34.

The method 200 of making ice cream 22 in accordance with the present disclosure is shown in FIG. 3. The method 200 includes step 202 in which the ice-cream mix 18 is provided. In an optional step 204, a vacuum is applied to the ice-cream mix 18. The ice-cream mix 18 is cooled to a temperature above freezing in a step 206. After step 206, a predetermined volume of compressed nitrogen is added to a predetermined volume of the ice-cream mix 18 in a step 208. The nitrogen is whipped into the ice-cream mix 18 to form ice cream 22 in a step 210. The ice cream 22 is dispensed in a step 212. Optionally, inclusions are added to the ice cream 22 in a step 214. In some embodiments, the method 200 includes simultaneously freezing and increasing a volume of the ice-cream mix 18.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. An ice cream making system comprising:
   a pre-treater including a cooler configured to cool a predetermined volume of liquid ice-cream mix to a temperature above a freezing temperature of the ice-cream mix and a vacuum source that applies and maintains a vacuum to the liquid ice-cream mix, and
   freezing means for adding a predetermined volume of compressed nitrogen to the predetermined volume of liquid ice-cream mix and whipping the predetermined volume of compressed nitrogen into the predetermined volume of liquid ice-cream mix to solidify the ice-cream mix and form solid ice cream,
   wherein the freezing means includes a nitrogen freezer that includes a nitrogen source, a volumetric controller configured to meter compressed nitrogen from the nitrogen source, and a mixer configured to whip the predetermined volume of compressed nitrogen into the predetermined volume of liquid ice-cream mix,
   wherein the cooler is configured to cool the liquid ice-cream mix to a temperature between 27 degrees and 34 degrees Fahrenheit prior to the liquid ice-cream mix reaching the freezing means and the predetermined volume of compressed nitrogen has a temperature of between −365 degrees Fahrenheit and −300 degrees Fahrenheit, and
   wherein the solid ice cream has an overrun based on the predetermined volumes of compressed nitrogen and ice-cream mix between 20 percent and 130 percent.

2. The ice cream making system of claim 1, wherein the mixer includes an aerator and wherein the mixer, with the aerator, whips the predetermined volume of compressed nitrogen into the predetermined volume of liquid ice-cream mix such that the solid ice cream has the overrun based on the predetermined volumes of compressed nitrogen and ice-cream mix of between 20 percent and 130 percent.

3. The ice cream making system of claim 1, further comprising a dispenser configured to discharge the solid ice cream out of the ice cream making system.

4. The ice cream making system of claim 1, wherein the solid ice cream has a temperature of 26 degrees Fahrenheit.

5. The ice cream making system of claim 1, wherein the volume of the solid ice cream is between 50 percent and 100 percent greater than the predetermined volume of liquid ice-cream mix.

6. The ice cream making system of claim 1, wherein the volume of the solid ice cream is between 20 percent and 80 percent greater than the predetermined volume of liquid ice-cream mix.

7. The ice cream making system of claim 6, wherein the volume of the solid ice cream is between 20 percent and 50 percent greater than the predetermined volume of liquid ice-cream mix.

8. The ice cream making system of claim 1, wherein the freezing means does not include a heat exchanger such that the predetermined volume of compressed nitrogen is whipped into the predetermined volume of liquid ice-cream mix by the freezing means to solidify the ice-cream mix and form solid ice cream without the use of a heat-exchanger.

9. The ice cream making system of claim 8, wherein the mixer includes an aerator and wherein the mixer, with the aerator, whips the predetermined volume of compressed nitrogen into the predetermined volume of liquid ice-cream mix such that the solid ice cream has a volume that is at least 20 percent greater than the predetermined volume of the liquid ice-cream mix.

10. An ice cream making system comprising
    a pre-treater configured to cool a liquid ice-cream mix to a temperature between 27 degrees and 34 degrees Fahrenheit,
    a nitrogen freezer configured to add a predetermined volume of compressed nitrogen to a predetermined volume of the liquid ice-cream mix to solidify the ice-cream mix without a heat exchanger to form solid ice cream, wherein the predetermined volume of the compressed nitrogen added to the predetermined volume of the liquid ice-cream mix has a temperature of between −365 degrees Fahrenheit and −300 degrees Fahrenheit, and
    a dispenser configured to discharge the ice cream out of the ice cream making system,
    wherein the nitrogen freezer includes a mixer having an aerator, and the mixer, with the aerator, whip the predetermined volume of compressed nitrogen into the predetermined volume of the liquid ice-cream mix such that the solid ice cream has a desired volume that is greater than the predetermined volume of the liquid ice-cream mix.

11. The ice cream making system of claim 10, wherein the pre-treater further includes a vacuum source that applies and maintains a vacuum to the liquid ice-cream mix.

12. The ice cream making system of claim 10, wherein a volume of the ice cream is between 20 percent and 130 percent greater than the predetermined volume of liquid ice-cream mix.

13. A method of making ice-cream, the method comprising providing a liquid ice-cream mix,
    pretreating the liquid ice-cream mix to cool the liquid ice-cream mix to a temperature between 27 degrees and 34 degrees Fahrenheit,
    adding a predetermined volume of compressed nitrogen to a predetermined volume of the liquid ice-cream mix, wherein the predetermined volume of the compressed nitrogen has a temperature of between −365 degrees Fahrenheit and −300 degrees Fahrenheit, and
    mixing the predetermined volume of compressed nitrogen into the predetermined volume of liquid ice-cream mix to freeze the predetermined volume of liquid ice-cream without a heat exchanger and form solid ice cream,
    wherein mixing includes whipping the predetermined volume of compressed nitrogen into the predetermined volume of liquid ice-cream mix using an aerator to cause the solid ice cream to have a volume that is at least 20 percent greater than the predetermined volume of the liquid ice-cream mix.

14. The method of claim 13, further including applying and maintaining a vacuum to the liquid ice-cream mix.

* * * * *